United States Patent [19]
Yeh

[11] Patent Number: 5,947,398
[45] Date of Patent: Sep. 7, 1999

[54] FISHING REEL ASSEMBLY

[76] Inventor: Shih-Yuan Yeh, No. 2-4, Chenhsing Rd., Taiping, Taichung Hsien, Taiwan

[21] Appl. No.: 09/074,581

[22] Filed: May 7, 1998

[51] Int. Cl.[6] .................................................... A01K 89/02
[52] U.S. Cl. ........................... 242/295; 242/282; 242/317
[58] Field of Search ................................... 242/295, 301, 242/317, 282

[56] References Cited

U.S. PATENT DOCUMENTS

| | | | |
|---|---|---|---|
| 987,676 | 3/1911 | Vom Hofe | 242/295 |
| 2,754,070 | 7/1956 | Schrall | 242/301 |
| 4,750,687 | 6/1988 | Sievert et al. | 242/295 |
| 5,161,750 | 11/1992 | Hitomi | 242/295 |
| 5,505,396 | 4/1996 | Chesterfield et al. | 242/317 |

Primary Examiner—Katherine Matecki
Attorney, Agent, or Firm—Dellett and Walters

[57] ABSTRACT

A fishing reel assembly includes a disk-shaped base defining an elongate slot, and a control member mounted on a first side of the base and formed with a slide slidably extending through the elongate slot. An inverted U-shaped control plate is movably mounted on a second side of the base and is secured to the slide of the control member to slide therewith. The control plate includes a first leg defining a first guiding slot and a second leg defining a second guiding slot. A first driven gear is rotatably and slidably received in the first guiding slot, and a second driven gear is rotatably and slidably received in the second guiding slot. A spool is rotatably mounted on the base, and a drive gear is fixedly mounted on the spool to rotate therewith and is rotatably disposed between the first driven gear and the second driven gear. In such a manner, the control plate can be adapted to displace between a first position where the first driven gear meshes with the drive gear to rotate therewith and a second position where the second driven gear meshes with the drive gear to rotate therewith.

10 Claims, 9 Drawing Sheets

FISHING REEL ASSEMBLY

FIELD OF THE INVENTION

The present invention relates to a fishing reel assembly.

BACKGROUND OF THE INVENTION

A conventional fishing reel includes a housing, a fishing rod fixedly mounted on the housing by a foot, and a spool rotatably mounted on the housing for winding and unwinding a fishing line which has a free end indirectly connected to the fishing rod. By such an arrangement, however, the spool usually has a large diameter of rotation such that the fishing rod easily vibrates when being used, thereby incurring an inconvenience in use and also reducing the efficiency for fishing. In addition, the conventional fishing reel is suitable for either a right-handed user or a left-handed user only, thereby greatly limiting the versatility of the fishing reel.

The present invention has arisen to mitigate and/or obviate the disadvantage of the conventional fishing reel.

SUMMARY OF THE INVENTION

In accordance with one aspect of the present invention, there is provided a fishing reel assembly comprising a disk-shaped base defining an elongate slot therein and including a first side and a second side having an outer periphery formed with an annular flange defining a chamber therein.

A control member is movably mounted on the first side of the base and includes a first side formed with a slide slidably extending through the elongate slot and a second side. A substantially inverted U-shaped control plate is movably mounted on the second side of the base and is secured to the slide of the control member to slide therewith. The control plate includes a first leg defining a first guiding slot and a second leg defining a second guiding slot.

A first driven gear is rotatably disposed between the second side of the base and the first leg of the control plate and is slidably received in the first guiding slot. A second driven gear is rotatably disposed between the second side of the base and the second leg of the control plate and is slidably received in the second guiding slot. A resistance means is mounted on the second side of the base for providing damping resistance to rotation of the first driven gear and the second driven gear.

A spool is rotatably mounted on the base, and a drive gear is fixedly mounted on the spool to rotate therewith and is rotatably disposed between the first driven gear and the second driven gear. By such an arrangement, the control plate is movable between a first position where the first driven gear meshes with the drive gear to rotate therewith and a second position where the second driven gear meshes with the drive gear to rotate therewith.

Further features of the present invention will become apparent after a careful reading of the detailed description with appropriate reference to the accompanying drawings.

DETAILED DESCRIPTION OF THE PREFERRED EMBODIMENTS

Figure 1:
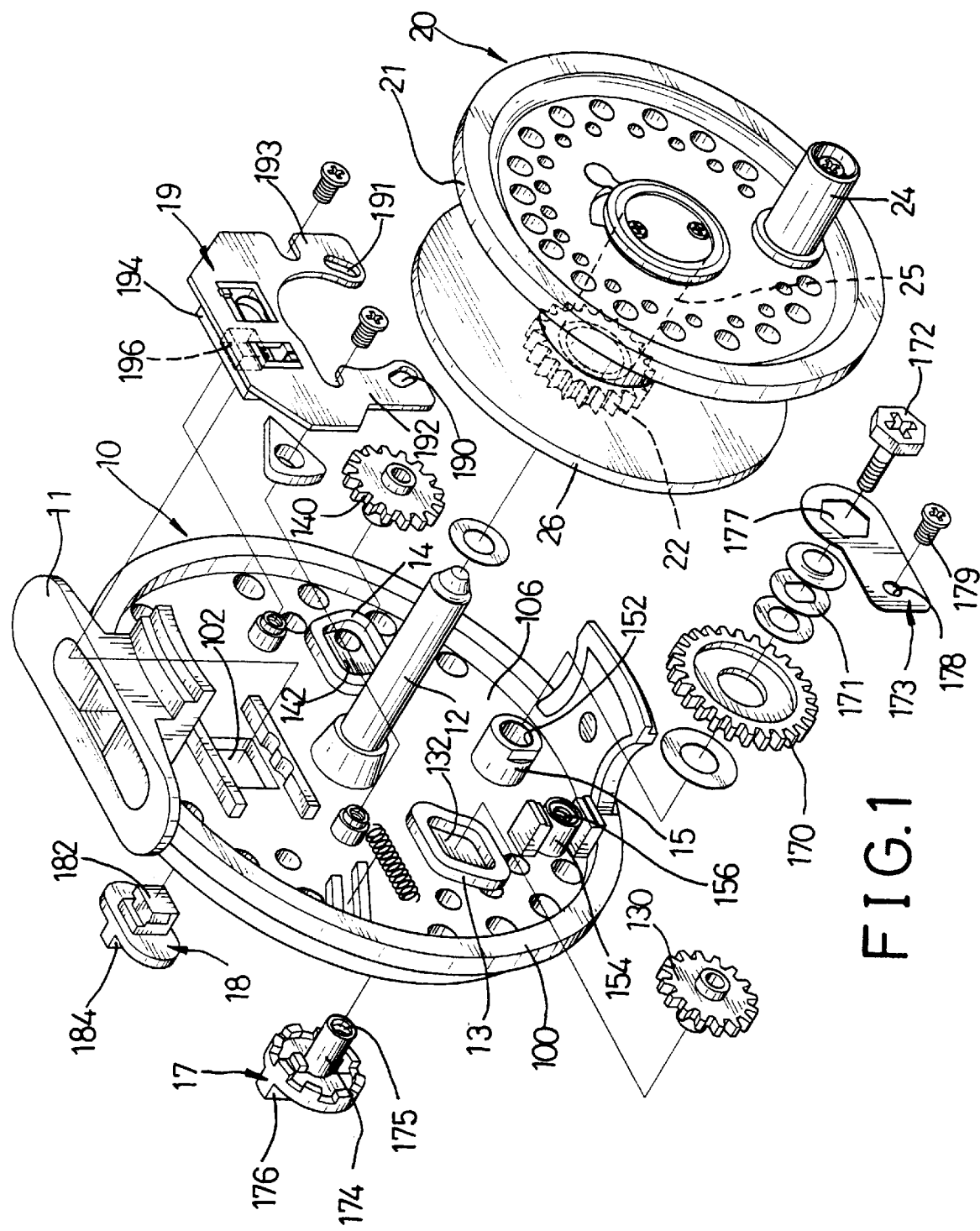
FIG. 1 is an exploded view of a fishing reel assembly in accordance with the present invention.

Referring to the drawings and initially to FIGS. 1–4, a fishing reel assembly in accordance with the present invention comprises a disk-shaped base 10 defining an elongate slot 102 therein and including a first side and a second side having an outer periphery formed with an annular flange 100 defining a chamber 106 therein. The base 10 includes a fixed shaft 12 extending outwardly from the second side thereof and located under the elongate slot 102.

A control member 18 is movably mounted on the first side of the base 10 and includes a first side formed with a slide 182 slidably extending through the elongate slot 102 and a second side formed with a control knob 184.

A substantially inverted U-shaped control plate 19 movably mounted on the second side of the base 10 is secured to the slide 182 of the control member 18 to slide therewith and includes a first leg 192 defining a first guiding slot 190 and a second leg 193 defining a second guiding slot 191. Preferably, the first guiding slot 190 and the second guiding slot 191 are inclined with each other to be arranged in a substantially V-shaped configuration.

The control plate 19 is formed with a retaining block 194 defining a receiving recess 196 for receiving the slide 182 of the control member 18 therein such that the control plate 19 can be moved with the control member 18.

A first driven gear 130 is rotatably disposed between the second side of the base 10 and the first leg 192 of the control plate 19 and is slidably received in the first guiding slot 190. A second driven gear 140 is rotatably disposed between the second side of the base 10 and the second leg 193 of the control plate 19 and is slidably received in the second guiding slot 191.

A first loop-shaped rib 13 is fixedly mounted on the second side of the base 10 and defines a first opening 132 for receiving the first driven gear 130 therein, and a second loop-shaped rib 14 is fixedly mounted on the second side of the base 10 and defines a second opening 142 for receiving the second driven gear 140 therein.

A spool 20 includes an axle 25 rotatably mounted around the shaft 12 and having a first end portion formed with a first disk 21 with a handgrip 24 being eccentrically mounted thereon and a second end portion formed with a second disk 26 rotatably mounted on the annular flange 100 of the base 10. A drive gear 22 is fixedly mounted on the second disk 26 of the spool 20 to rotate therewith and is rotatably disposed between the first driven gear 130 and the second driven gear 140.

A resistance device is mounted on the second side of the base 10 for providing damping resistance to rotation of the first driven gear 130 and the second driven gear 140.

The resistance device comprises a stub 15 formed on the second side of the base 10 and defining a hole 152, a resistance gear 170 rotatably mounted around the stub 15 and located between the first driven gear 130 and the second driven gear 140, a resistance adjusting member 17 rotatably mounted on the first side of the base 10 and including a first side formed with a threaded rod. 174 extending through the hole 152 of the stub 15 and defining a threaded hole 175, and a second side formed with a resistance adjusting knob 176, an adjusting screw 172 fixedly mounted on the second side of the base 10 and threadedly engaged in the threaded hole 175 of the threaded rod 174, and a biasing member such as a plurality of disk springs 171 urged between the resistance gear 170 and the adjusting screw 172.

The resistance device further comprises a stud 154 formed on the second side of the base 10 and defining a threaded bore 156, a retaining plate 173 mounted between the biasing member 171 and the adjusting screw 172 and including a first end portion defining a bore 178 aligning with the threaded bore 156 and a second end portion defining a hexagonal socket 177 for securely receiving a hexagonal head of the adjusting screw 172 therein such that the adjusting screw 172 can be fixed by the retaining plate 173, and a positioning screw 179 extending through the bore 178 and threadedly engaged in the threaded bore 156 for fixing the retaining plate 173 on the stud 154.

Figure 2:
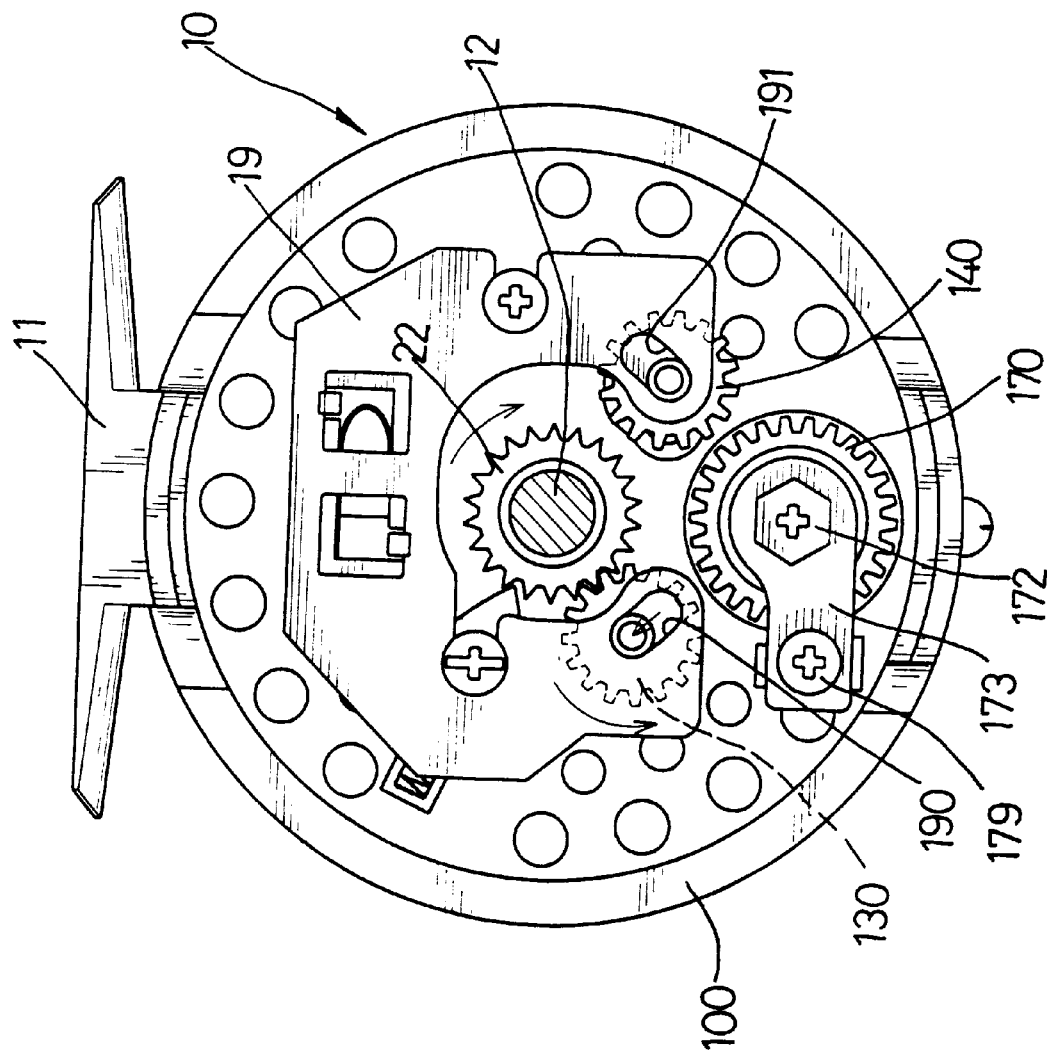
FIG. 2 is a front plan partially assembled view of the fishing reel assembly as shown in FIG. 1.
Figure 3:
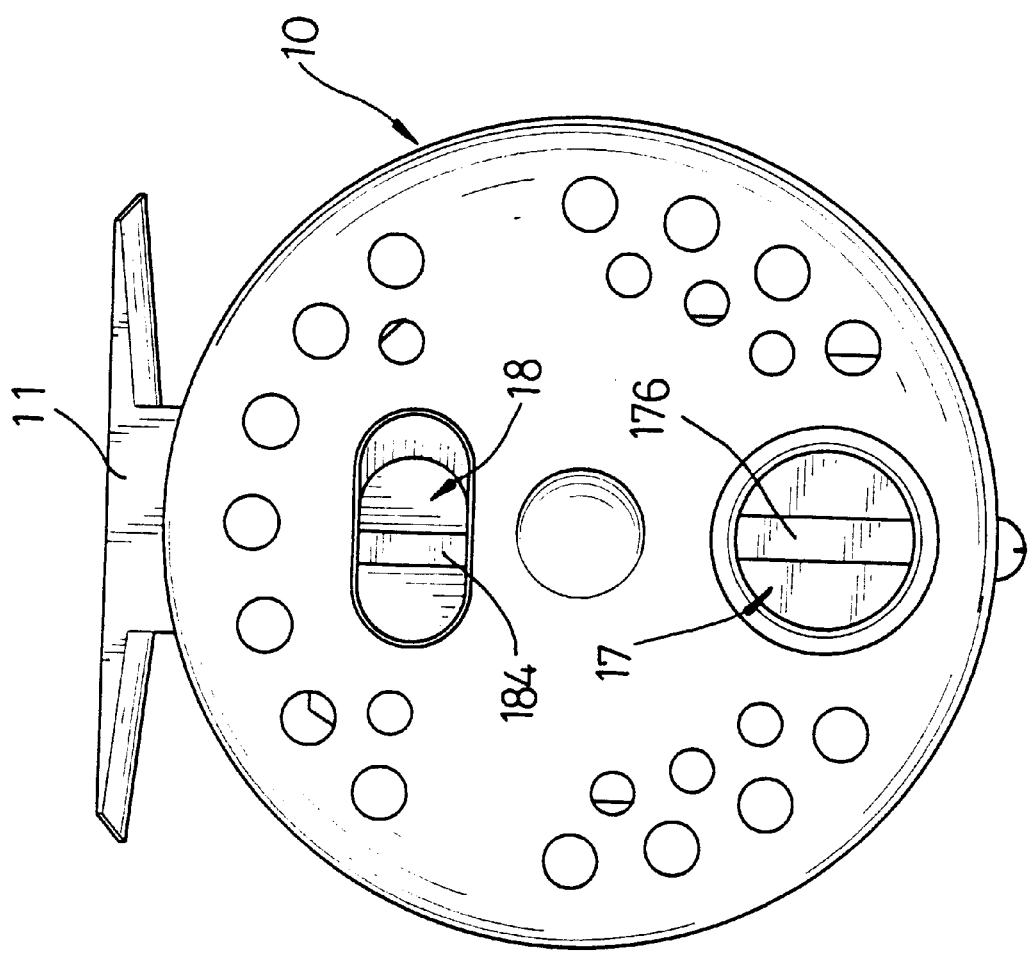
FIG. 3 is a rear plan assembly view of the fishing reel assembly as shown in FIG. 1.
Figure 4:
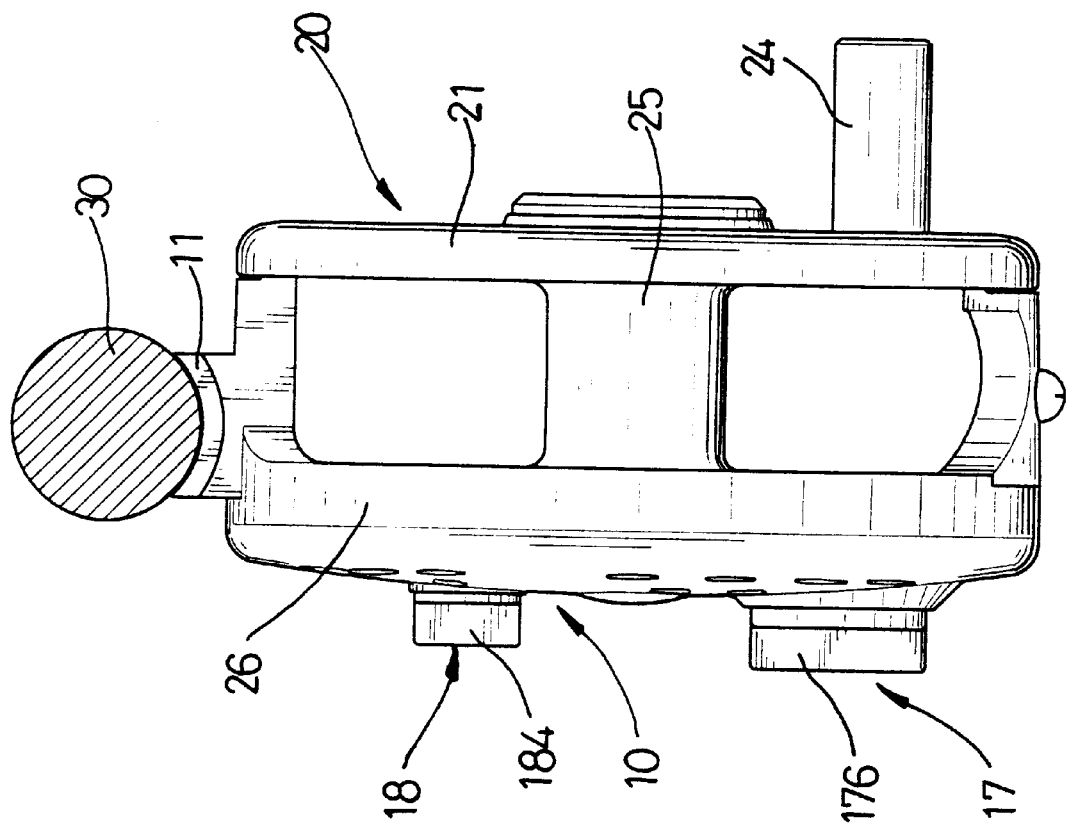
FIG. 4 is a partially cross-sectional side assembly view of the fishing reel assembly as shown in FIG. 1.

In operation, referring to FIGS. 1–5, in accordance with a first embodiment of the present invention, wherein the fishing reel assembly can be adapted to be suitable for a right-handed user as shown in FIG. 4.

A foot 11 is fixedly mounted on an outer periphery of the base 10 for supporting a fishing rod 30, and a fishing line (not shown) can be wound around the. axle 25 between the first disk 21 and the second disk 26 and includes a free end connected to a tip ring (not shown) mounted on the fishing rod 30.

The control knob 184 of the control member 18 can initially be moved to a first position as shown in FIG. 3, thereby displacing the control plate 19 to a first position as shown in FIG. 2 where the first driven gear 130 is moved with the control plate 19 to mesh with the drive gear 22.

In such a manner, the fishing line wound around the axle 25 can be thrown to move outwardly by a user, thereby rotating the axle 25 of the spool 20 such that the drive gear 22 can be rotated along a clockwise direction as shown in FIG. 2.

The first driven gear 130 meshing with the drive gear. 22 can then be rotated along a counterclockwise direction and can be displaced upwardly along the first guiding slot 190 in an inclined manner to reach a topmost edge of the first guiding slot 190 where the first driven gear 130 does not mesh with the resistance gear 170 such that the first driven gear 130 can be rotated freely without the interference of the resistance gear 170, thereby facilitating the rotation of the drive gear 22 together with the axle 25 of the spool 20 such that the fishing line can be quickly thrown outwardly without resistance.

Figure 5:
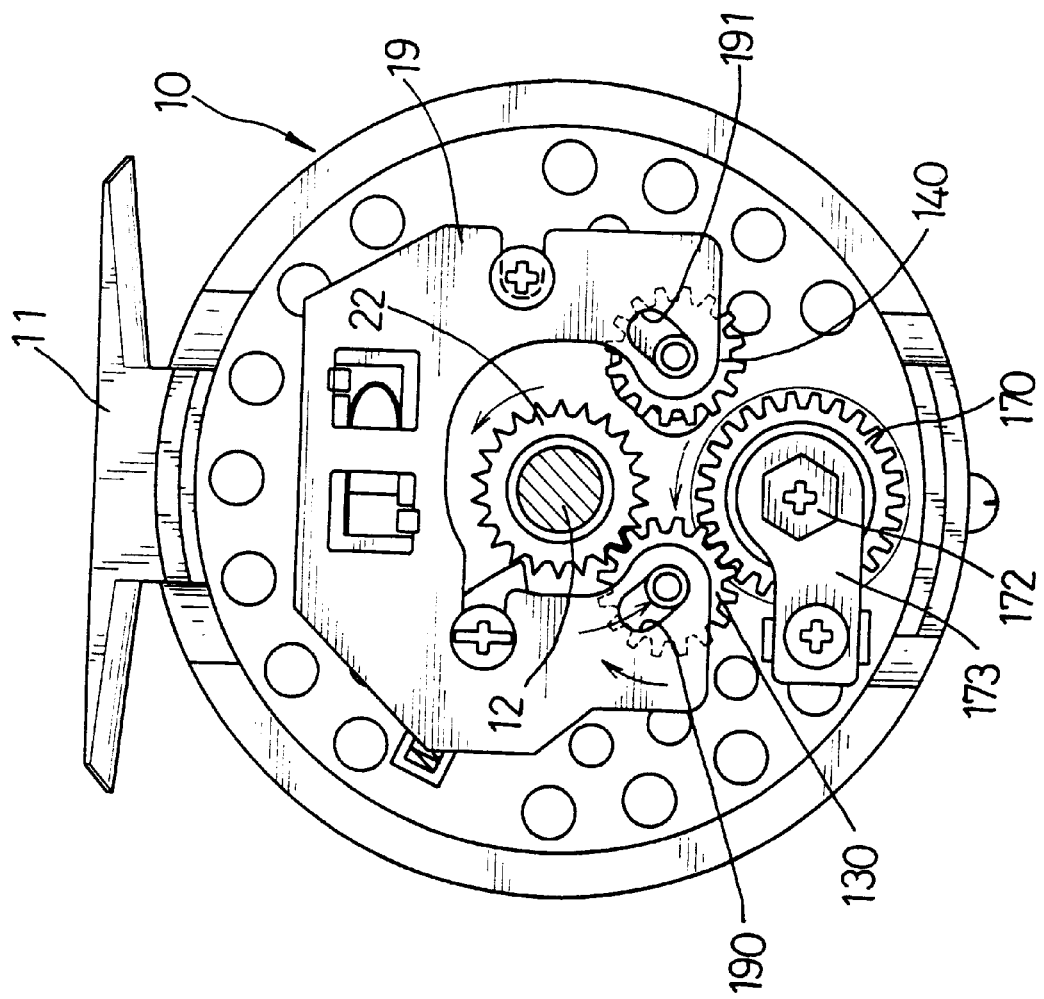
FIG. 5 is an operational view of FIG. 2.

When the user is intended to return the fishing line, he can push the handgrip 24 to rotate the first disk 21 of the spool 20 along a counterclockwise direction, thereby rotating the axle 25 of the spool 20 such that the drive gear 22 can be rotated along a counterclockwise direction as shown in FIG. 5.

The first driven gear 130 meshing with the drive gear 22 can then be rotated along a clockwise direction and can be displaced downwardly along the first guiding slot 190 in an inclined manner to reach a lowermost edge of the first guiding slot 190 where the first driven gear 130 mesh with the resistance gear 170 such that the rotation of the first driven gear 130 is retarded by means of the damping action of the resistance gear 170, thereby retarding the rotation of the drive gear 22 together with the axle 25 of the spool 20 such that the fishing line can be actually returned to the axle 25 in a slower speed.

The resistance adjusting member 17 can be rotated relative to the adjusting screw 172 by means of rotating the resistance adjusting knob 176 such that the distance between the resistance gear 170 and the adjusting screw 17 can be changed slightly by means of the urging action of the disk springs 171, thereby adjusting the pressing force exerted on the resistance gear 170 by the disk springs 171 such that the resistance exerted on the first driven gear 130 by the resistance gear 170 can be properly adjusted.

Figure 7:
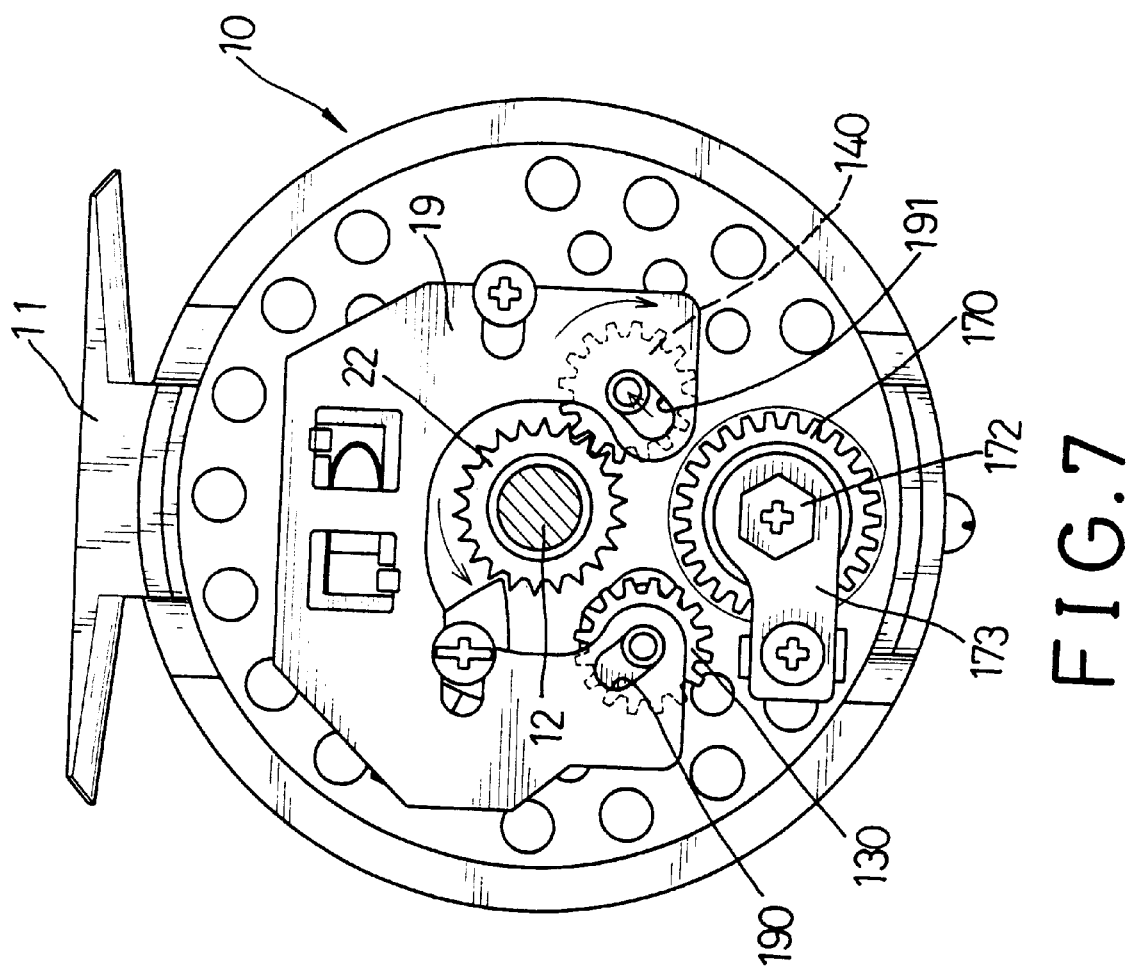
FIG. 7 is a front plan partially assembled view of the fishing reel assembly as shown in FIG. 1.
Figure 8:
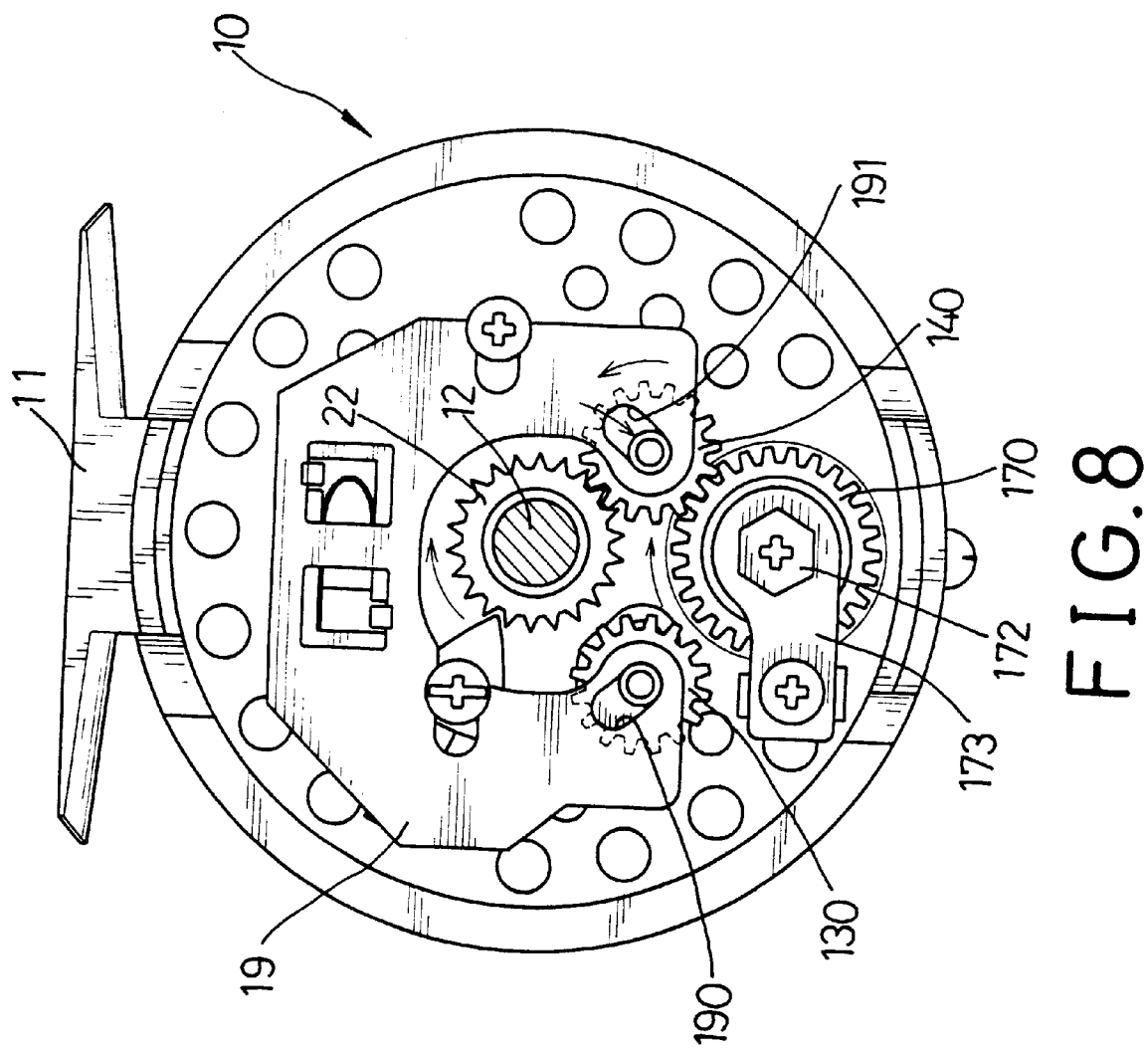
FIG. 8 is an operational view of FIG. 7.
Figure 9:
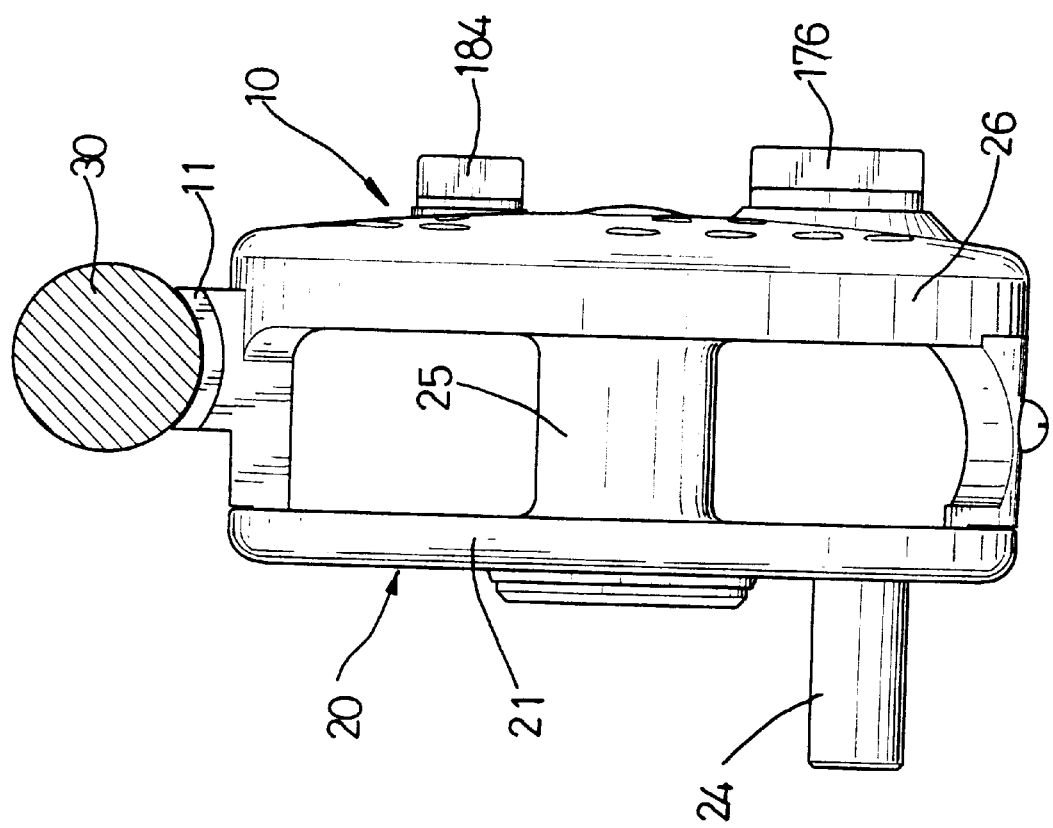
FIG. 9 is a partially cross-sectional side assembly view of the fishing reel assembly as shown in FIG. 1.

Referring now to FIGS. 6–9 with reference to FIG. 1, the fishing reel assembly can be adapted to be suitable for a left-handed user as shown in FIG. 9.

Figure 6:
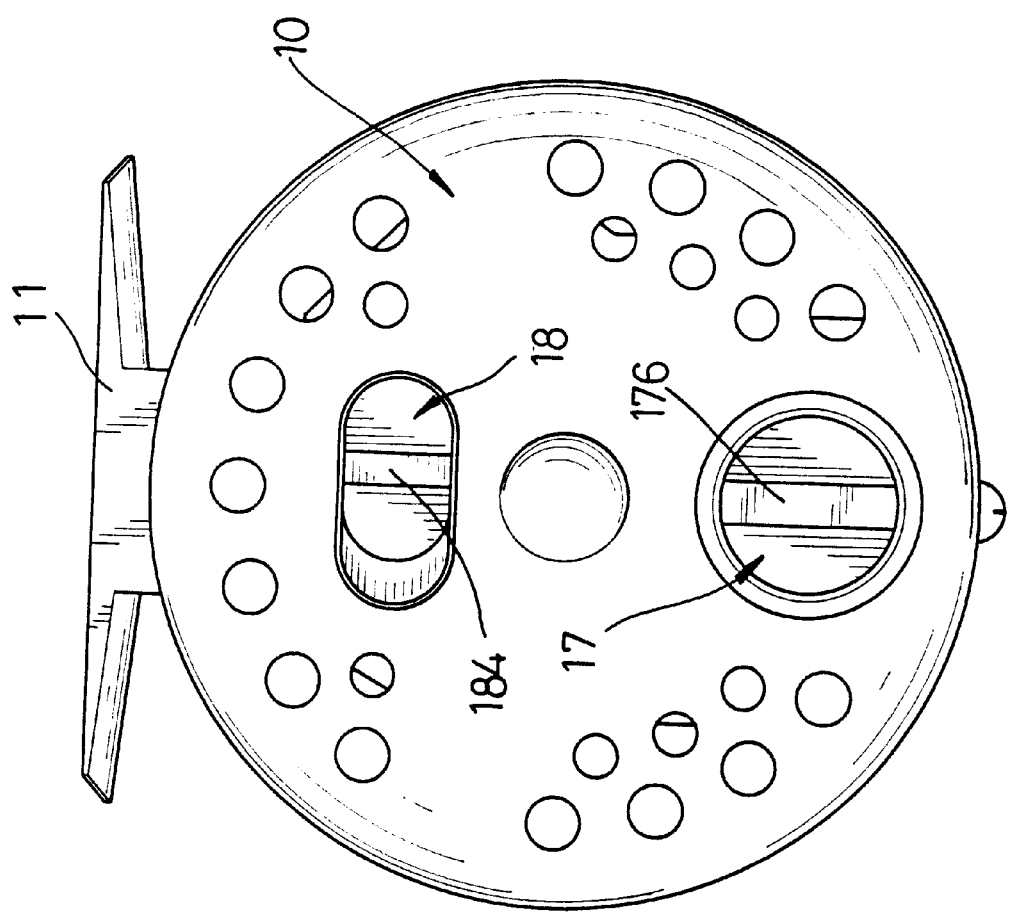
FIG. 6 is a rear plan operational view of the fishing reel assembly as shown in FIG. 1.

The control knob 184 of the control member 18 can be moved to a second position as shown in FIG. 6, thereby displacing the control plate 19 to a second position as shown in FIG. 7 where the second driven gear 140 is moved with the control plate 19 to mesh with the drive gear 22.

In such a manner, the fishing line (not shown) wound around the axle 25 can be thrown to move outwardly by a user, thereby rotating the axle 25 of the spool 20 such that the drive gear 22 can be rotated along a counterclockwise direction as shown in FIG. 7.

The second driven gear 140 meshing with the drive gear 22 can then be rotated along a clockwise direction and can be displaced upwardly along the second guiding slot 191 in an inclined manner to reach a topmost edge of the second guiding slot 191 where the second driven gear 140 does not mesh with the resistance gear 170 such that the second driven gear 140 can be rotated freely without the interference of the resistance gear 170, thereby facilitating the rotation of the drive gear 22 together with the axle 25 of the spool 2-0 such that the fishing line can be quickly thrown outwardly without resistance.

When the user is intended to return the fishing line, he can push the handgrip 24 to rotate the first disk 21 of the spool 20 along a clockwise direction, thereby rotating the axle 25 of the spool 20 such that the drive gear 22 can be rotated along a clockwise direction as shown in FIG. 8.

The second driven gear 140 meshing with the drive gear 22 can then be rotated along a counterclockwise direction and can be displaced downwardly along the second guiding slot 191 in an inclined manner to reach a lowermost edge of the second guiding slot 191 where the second driven gear 140 mesh with the resistance gear 170 such that the rotation of the second driven gear 140 is retarded by means of the damping action of the resistance gear 170, thereby retarding the rotation of the drive gear 22 together with the axle 25 of the spool 20 such that the fishing line can be actually returned to the axle 25 in a slower speed.

It should be clear to those skilled in the art that further embodiments may be made without departing from the scope and spirit of the present invention.

What is claimed is:

1. A fishing reel assembly comprising:
   a disk-shaped base (10) defining an elongate slot (102) therein and including a first side and a second side having an outer periphery formed with an annular flange (100) defining a chamber (106) therein;
   a control member (18) movably mounted on said first side of said base (10) and including a first side formed with a slide (182) slidably extending through said elongate slot (102) and a second side;

a substantially inverted U-shaped control plate (19) movably mounted on said second side of said base (10) and secured to said slide (182) of said control member (18) to slide therewith, said control plate (19) including a first leg (192) defining a first guiding slot (190) and a second leg (193) defining a second guiding slot (191);

a first driven gear (130) rotatably disposed between said second side of said base (10) and said first leg (192) of said control plate (19) and slidably received in said first guiding slot (190);

a second driven gear (140) rotatably disposed, between said second side of said base (10) and said second leg (193) of said control plate (19) and slidably received in said second guiding slot (191);

resistance means mounted on said second side of said base (10) for providing damping resistance to rotation of said first driven gear (130) and said second driven gear (140);

a spool (20) rotatably mounted on said base (10); and a drive gear (22) fixedly mounted on said spool (20) to rotate therewith and rotatably disposed between said first driven gear (130) and said second driven gear (140);

wherein, said control plate (19) is movable between a first position where said first driven gear (130) meshes with said drive gear (22) to rotate therewith and a second position where said second driven gear (140) meshes with said drive gear (22) to rotate therewith.

2. The fishing reel assembly in accordance with claim 1, wherein said first guiding slot (190) and said second guiding slot (191) are inclined with each other to be arranged in a substantially V-shaped configuration.

3. The fishing reel assembly in accordance with claim 1, wherein said base (10) includes a fixed shaft (12) extending outwardly from said second side thereof, and said spool (20) includes an axle (25) rotatably mounted around said shaft (12) and having a first end portion formed with a first disk (21) and a second end portion formed with a second disk (26) on which said drive gear (22) is fixedly mounted.

4. The fishing reel assembly in accordance with claim 3, wherein said spool includes a handgrip (24) eccentrically mounted on said first disk (21) thereof.

5. The fishing reel assembly in accordance with claim 1, further comprising a first loop-shaped rib (13) fixedly mounted on said second side of said base (10) and defining a first opening (132) for receiving said first driven gear (130) therein, and a second loop-shaped rib (14) fixedly mounted on said second side of said base (10) and defining a second opening (142) for receiving said second driven gear (140) therein.

6. The fishing reel assembly in accordance with claim 1, wherein said second side of said control member (18) is formed with a control knob (184).

7. The fishing reel assembly in accordance with claim 1, wherein said resistance means comprises a stub (15) formed on said second side of said base (10) and defining a hole (152), a resistance gear (170) rotatably mounted around said stub (15) and located between said first driven gear (130) and said second driven gear (140), a resistance adjusting member (17) rotatably mounted on said first side of said base (10) and including a first side formed with a threaded rod (174) extending through said hole (152) of said stub (15) and defining a threaded hole (175) and a second side, an adjusting screw (172) fixedly mounted on said second side of said base (10) and threadedly engaged in said threaded hole (175) of said threaded rod (174), and a biasing member (171) urged between said resistance gear (170) and said adjusting screw (172).

8. The fishing reel assembly in accordance with claim 7, wherein said second side of said resistance adjusting member (17) is formed with a resistance adjusting knob (176).

9. The fishing reel assembly in accordance with claim 7, wherein said resistance means further comprises a stud (154) formed on said second side of said base (10) and defining a threaded bore (156), a retaining plate (173) mounted between said biasing member (171) and said adjusting screw (172) and including a first end portion defining a bore (178) aligning with said threaded bore (156) and a second end portion defining a socket (177) for securely receiving said adjusting screw (172) therein, and a positioning screw (179) extending through said bore (178) and threadedly engaged in said threaded bore (156) for fixing said retaining plate (173) on said stud (154).

10. The fishing reel assembly in accordance with claim 9, wherein said adjusting screw (172) is formed with a hexagonal head, and said socket (177) has a hexagonal shape mating that of said hexagonal head of said adjusting screw (172).

* * * * *